United States Patent
Lin et al.

(10) Patent No.: US 7,307,709 B2
(45) Date of Patent: Dec. 11, 2007

(54) DEVICE AND METHOD FOR OPTICAL CENTER DETECTION

(75) Inventors: Yi-Hsuan Lin, Taichung (TW); Teck Wee Low, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 206 days.

(21) Appl. No.: 11/172,869

(22) Filed: Jul. 5, 2005

(65) Prior Publication Data
US 2006/0007428 A1    Jan. 12, 2006

(30) Foreign Application Priority Data
Jul. 6, 2004    (TW) .............................. 93120225 A (51) Int. Cl.
*G01N 21/41* (2006.01)
(52) U.S. Cl. ...................................... 356/128; 356/127
(58) Field of Classification Search ........ 356/124–128, 356/400, 153, 213–222
See application file for complete search history.

(56) References Cited
U.S. PATENT DOCUMENTS
5,108,174 A * 4/1992 Lippens ...................... 356/124
* cited by examiner

*Primary Examiner*—Gregory J. Toatley, Jr.
*Assistant Examiner*—Tri Ton
(74) *Attorney, Agent, or Firm*—Rader, Fishman & Grauer PLLC (57) ABSTRACT

A device is presented for computing an optical center of a sensor array relative to a lens. The sensor array includes a plurality of sensor units, and each sensor unit has a position on the sensor array. The lens defines an optical axis. The device includes a configuration module and a processing circuit. The configuration module is provided for positioning the lens and the sensor array thereon. When test light is parallel to the optical axis and is incident to the lens, the sensor array receives the test light transmitted by the lens so that each sensor unit outputs a value. The processing circuit is linked to the sensor array for receiving values outputted from the sensor units and selecting positions of sensor units outputting a specific value among the values, for computing the optical center of the sensor array.

24 Claims, 9 Drawing Sheets

|   | 1 | 2 | 3 | 4 | 5 | 6 | 7 |
|---|---|---|---|---|---|---|---|
| 7 |   |   |   | A |   |   |   |
| 6 |   |   | A |   | A |   |   |
| 5 |   | A | B |   |   | A |   |
| 4 | A | B |   | B |   |   | A |
| 3 |   | A | B |   |   | A |   |
| 2 |   |   | A |   | A |   |   |
| 1 |   |   |   | A |   |   |   |

~ 104 sensor array

FIG. 2d

|   | 1 | 2 | 3 | 4 | 5 | 6 | 7 |
|---|---|---|---|---|---|---|---|
| 7 |   |   |   | C |   |   |   |
| 6 |   |   | C | A | C |   |   |
| 5 |   | C | A | C | A | C |   |
| 4 | C | A | C |   | C | A | C |
| 3 |   | C | A | C | A | C |   |
| 2 |   |   | C | A | C |   |   |
| 1 |   |   |   | C |   |   |   |

~ 104 sensor array

DEVICE AND METHOD FOR OPTICAL CENTER DETECTION

CROSS REFERENCE TO RELATED APPLICATIONS

This application claims the right of priority based on Taiwan Patent Application No. 093120225 entitled "Device and Method for Optical Center Detection", filed on Jul. 6, 2004, which is incorporated herein by reference and assigned to the assignee herein.

FIELD OF INVENTION

The present invention relates to a device and a method for optical center detection. More specifically, it relates to a device and a method for optical center detection for a digital image forming system.

BACKGROUND OF THE INVENTION

For a digital camera, the lens receives the light and transmits it to the sensor device, such as Charge Coupled Device, CCD. By the CCD, the collected light is transformed into digital image signals which are further stored in the memory. Typically, the sensor device includes a sensor array, conventional types of which include pixels of "320×240", "640×480", "1280×960", "2048×1536", and so on.

During the assembling process of a digital image forming device (e.g., a digital camera), it is crucial to align the optical axis of the lens and the center of the sensor array, particularly for those high-end products. "Optical center" recited hereinafter refers to the intersection of the optical axis of the lens and the sensor array. The mis-alignment of the optical center and the center of the sensor array will affect the quality of the outputted digital image.

Conventional alignment within the lens barrel relies on the position pins to mount the sensor array on the image plane. However, for the high-end single lens reflex camera, the lens is replaceable, so the design using the position pin becomes too complicated. U.S. Pat. No. 5,483,284 disclosed that position pins at four corners are used to mount the sensor array on the image plane. However, U.S. Pat. No. 5,483,284 did not disclose how to suitably adjust the position of the sensor array along the direction perpendicular to the optical axis. In addition, U.S. Pat. No. 6,628,339 disclosed a mounting structure including a mounting plate to adjust the position of the sensor array along the directions parallel and perpendicular to the optical axis.

Simply put, for a convergent or divergent optical element, "optical axis" will pass the center of curvature of each surface and also pass through the focal point of the optical element. However, "optical axis" is intangible, so no practical method has existed yet to determine whether the optical center and the center of the sensor array are aligned. As it is known, when light is parallel to the optical axis and is incident to the lens, it is focused and results in the highest illumination at a focal point of the lens. Therefore, the focal point can be determined by detecting the position of the highest illumination, and the alignment of the optical center and the center of the sensor array can be achieved. However, in reality, the noise will make the position of the highest illumination differ from the actual focal point, and hinder the alignment of the optical center and the center of the sensor array.

SUMMARY OF THE INVENTION

The main aspect of the present invention is to provide a device and a method for optical center detection on a sensor array.

Another aspect of the present invention is to provide a device and a method for aligning the optical center and the center of the sensor array.

Still another aspect of the present invention is to provide a device and a method for detecting the offset between the optical center and the center of the sensor array during the manufacturing process of the digital image forming device.

Further another aspect of the present invention is to provide a method for examining the image pick-up module including a lens and a sensor array. The quality of the image pick-up module is determined by the offset between the optical center and the center of the sensor array.

When light is parallel to the optical axis and is incident to the lens, the distribution of the illumination is axially symmetrical for any plane perpendicular to the optical axis. Thus a planar sensor array perpendicular to the optical axis is used to receive the light transmitted from the lens. When the distribution of the illumination detected on the sensor array is axial symmetrically, the intersection of the optical axis and the sensor array, or the optical center referred to in the present invention, can be inferred as being aligned based on the symmetry. In an embodiment, the distribution of the illumination on the image plane is analyzed and contoured, and the optical center is computed as a geometrical center of the "illumination contour". Compared with the conventional method for the optical center detection utilizing the focal point, the method disclosed by the present invention is simpler and more accurate. Furthermore, the offset between the optical center and the center of the sensor array can be easily determined.

In one embodiment, disclosed is a device for computing an optical center of a sensor array relative to a lens. The sensor array includes a plurality of sensor units, and each sensor unit has a position on the sensor array. The lens defines an optical axis. The device includes a configuration module and a processing circuit. The configuration module is provided for positioning the lens and the sensor array thereon. When test light is parallel to the optical axis and is incident to the lens, the sensor array receives the test light transmitted by the lens so that each sensor unit outputs a value. The processing circuit is linked to the sensor array for receiving values outputted from the sensor units and selecting positions of sensor units outputting a specific value among the values, for computing the optical center of the sensor array.

Also disclosed is a method for computing an optical center of a sensor array relative to a lens. The sensor array includes a plurality of sensor units, and each sensor unit has a position on the sensor array. The lens defines an optical axis. The method includes: (a) providing test light parallel to the optical axis and incident to the lens; (b) receiving, by the sensor array, the test light transmitted by the lens so that each sensor unit outputs a value; (c) selecting positions of sensor units outputting a specific value among the values outputted from the sensor units; and (d) computing the optical center of the sensor array based on the selected positions.

The foregoing and other features of the invention will be apparent from the following more particular description of embodiment of the invention.

BRIEF DESCRIPTION OF THE DRAWINGS

The present invention is illustrated by way of example and not intended to be limited by the figures of the accompanying drawing, in which like notations indicate similar elements.

DETAILED DESCRIPTION

Figure 1A:
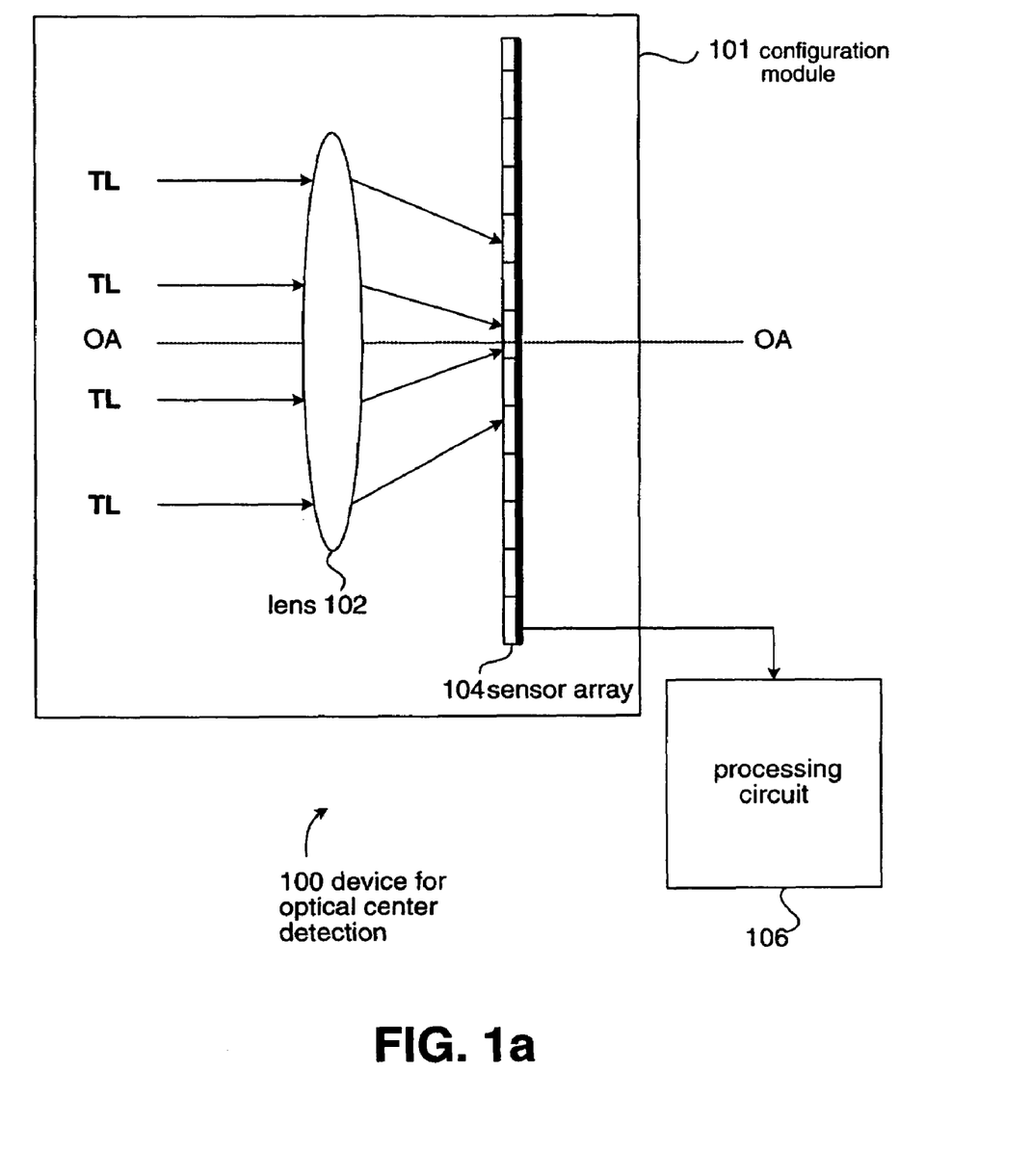
FIG. 1a is an illustration of a device according to an embodiment of the present invention.

Referring to FIG. 1a, a device 100 is provided for computing an optical center of a sensor array 104 relative to a lens 102. The device 100 includes a configuration module 101 and a processing circuit 106. Note that the combination of the lens 102 and the sensor array 104 can form an image pick-up module for the device 100 to generate a digital image corresponding to a target.

In an embodiment, the configuration module 101 has a base (not shown) for positioning the lens 102 and the sensor array 104 thereon, and provides the electrical connection with the sensor array 104. Alternatively, according to the result of computation mentioned hereinafter, the base of the configuration module 101 can be adjusted for the alignment of lens 102 relative to the sensor array 104. After the alignment was done, the relative position of the lens 102 to the sensor array 104 can be fixed using the conventional packaging technology. The packaged lens 102 and the sensor array 104 together can be detached from the configuration module 101, and the configuration module 101 can be used for the alignment procedure of another set of the lens 102 and the sensor array 104.

The lens 102 defines an optical axis, OA. A test light, TL, is parallel to OA and is incident to the lens 102. The sensor array 104 receives the test light transmitted by the lens. In an embodiment, the configuration module 101 further includes a uniform planar light source (not shown), such as the light source box provided by Tsubosaka Electric Co., Ltd, or an Integrating Sphere for providing the test light. Also a typical light source with a diffuser can be utilized for the purpose as the uniform planar light source. Before being applied, the test light is measured by using a light meter or other optical instruments to ensure the uniformity and the direction of the test light. The lens 102 is not limited to a convergent lens, a divergent lens, a deflective lens, or a reflective lens. In addition, the lens 102 can be embodied as a combination of several lenses achieving the same effect required in the present invention.

The sensor array 104 can be a CMOS sensor array, a CCD sensor array, or other sensor array capable of detecting the illumination. In an embodiment, the configuration module 101 further includes a digital signal processor (DSP) (not shown) for incorporating with each sensor unit to output a value. Preferably, the sensor array 104 uses the OV9640 sensor array provided by OmniVision Technologies, Inc., which includes a CMOS sensor array and a DSP for outputting a signal representing the value. In addition, the sensor array 104 further includes a Universal Serial Bus (USB) controller (e.g., CY7C68019 provided by Cypress Semiconductor Corporation) for outputting the signal via the Universal Serial Bus.

FIGS. 2a-2d illustrate the sensor array 104 according to different embodiments of the present invention. Those skilled in the art should know that the sensor array 104 can be embodied as the honeycomb-type sensor array or the sensor array of other arrangement. The sensor array 104 has a plurality of sensor units. Each sensor unit has a position on the sensor array 104. By detecting the illumination of the test light transmitted by the lens 102, each sensor unit outputs a value. It should be noted that the sensor array 104 is not limited as being placed on the image plane of the lens 102, but can be placed at any plane parallel to the image plane.

The processing circuit 106 is linked to the sensor array 104 on the configuration module 101. The processing circuit 106 receives values outputted from the sensor units of the sensor array 104, selects positions of sensor units outputting a specific value among the values received, and computes an optical center on the sensor array 104. In an embodiment, the processing circuit 106 is embodied as a personal computer linked to the configuration module 101 via USB. In other embodiments, the processing circuit 106 can be an application specific integrated circuit or a general usage integrated circuit, and can be implemented by hardware, software, or their combination.

As follows, the sensor array 104 is further exemplified by FIGS. 2a-2d with denotations of the coordinates, wherein the sensor array 104 has "7×7" sensor units with 49 positions thereon. It should be noted that the position (4, 4) is the center of the sensor array 104. Therefore, whether the alignment of the lens 102 and the sensor array 104 is acceptable is determined by the offset between the position of the optical center on the sensor array 104 and the position of the center of the sensor array 104.

Figure 2A:
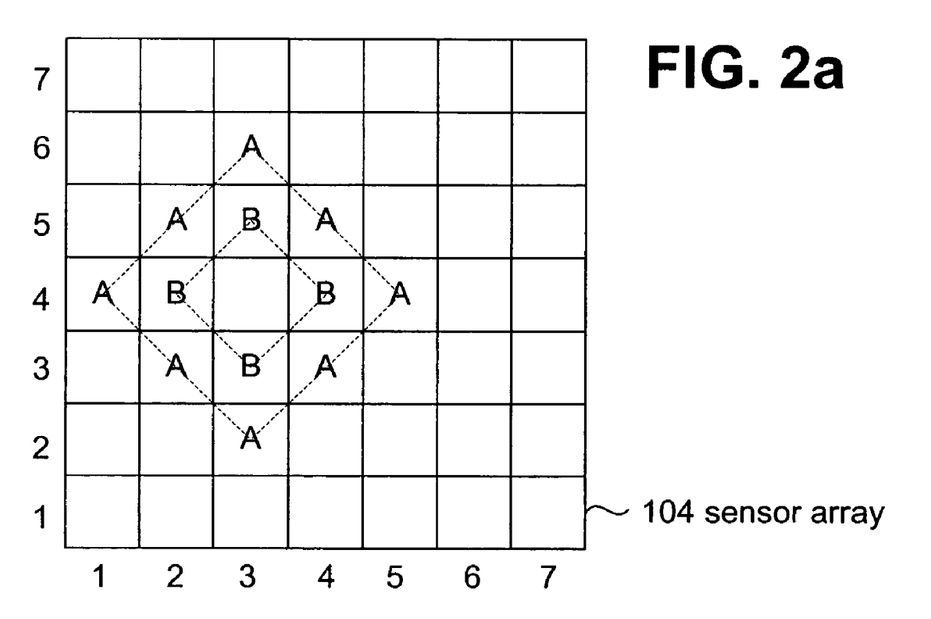
FIGS. 2a-2d illustrate the sensor arrays according to embodiments of the present invention.

Referring to FIG. 2a, the sensor units which are denoted as "A" all output a specific value (e.g., equal to 100) representing same illumination, and the sensor units which are denoted as "B" all output another value (e.g., equal to 200) representing same illumination. All positions of the sensor units A (or B) form a close loop on the sensor array 104. The optical center is a geometrical center (3, 4) of all positions of the sensor units A, or a geometrical center (3, 4) of all positions of the sensor units B, or a geometrical center (3, 4) of all positions of the sensor units A and B. The computation for the optical center is related to the characteristics of the lens 102 (e.g., divergent or convergent) and the characteristics of the sensor array 104 (e.g., the outputted value is proportional or inverse proportional to the illumination). In an embodiment where the lens 102 is convergent and the outputted value of the sensor array 104 is proportional to the illumination, sensor units outputting the maximum among the values received from the sensor array 104 are selected as the sensor units A, and the optical center is (3, 4), the geometrical center of all the positions of the sensor units A.

Figure 2B:
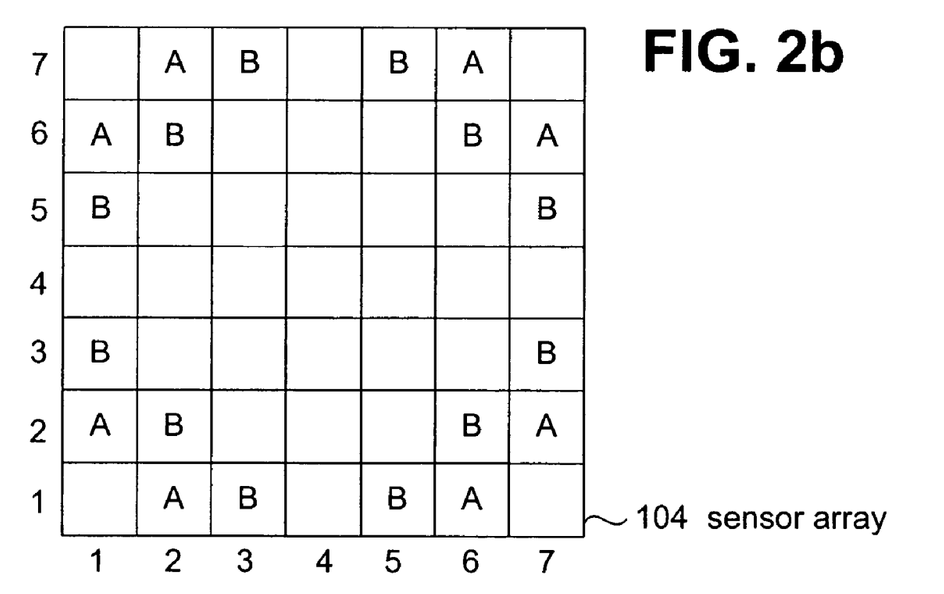
Figure 2C:
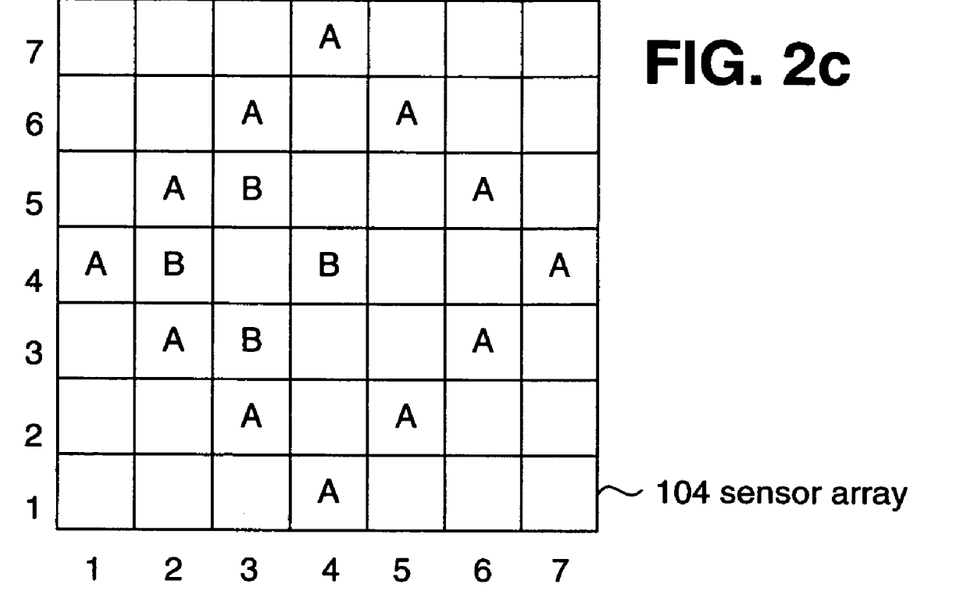

Referring to FIG. 2b, all sensor units that are denoted as "A" output a specific value representing same illumination, and all sensor units that are denoted as "B" output another value representing another same illumination. The distribution of all positions of the sensor units A (or B) is axially symmetrical on the sensor array 104. The optical center is a geometrical center (4, 4) of all positions of the sensor units A, or as a geometrical center (4, 4) of all positions of the sensor units B, or as a geometrical center (4,4) of all the positions of the sensor units A and B. In an embodiment where the lens 102 is divergent and the outputted value of the sensor array 104 is proportional to the illumination, sensor units outputting the maximum among the values received from the sensor array 104 are selected as the sensor units B, and the optical center is computed as (4, 4), the geometrical center of all the positions of the sensor units B.

In another embodiment for conditions in FIG. 2a or 2b, wherein the value outputted by sensor units A is larger than other values outputted by any other sensor units on the sensor array 104, a geometrical center of all the positions of the sensor units A is computed as the optical center. In still another condition where number of the sensor units B are more than that of the sensor units A, a geometrical center of all the positions of the sensor units B is computed as the optical center. It should be noted that, for the exemplary purpose, the geometrical center of all positions of the sensor units A and the geometrical center of all positions of the sensor units B are the same. However, in a case shown in FIG. 2c, the geometrical center of all positions of the sensor units A and the geometrical center of all positions of the sensor units B are different.

Figure 2D:
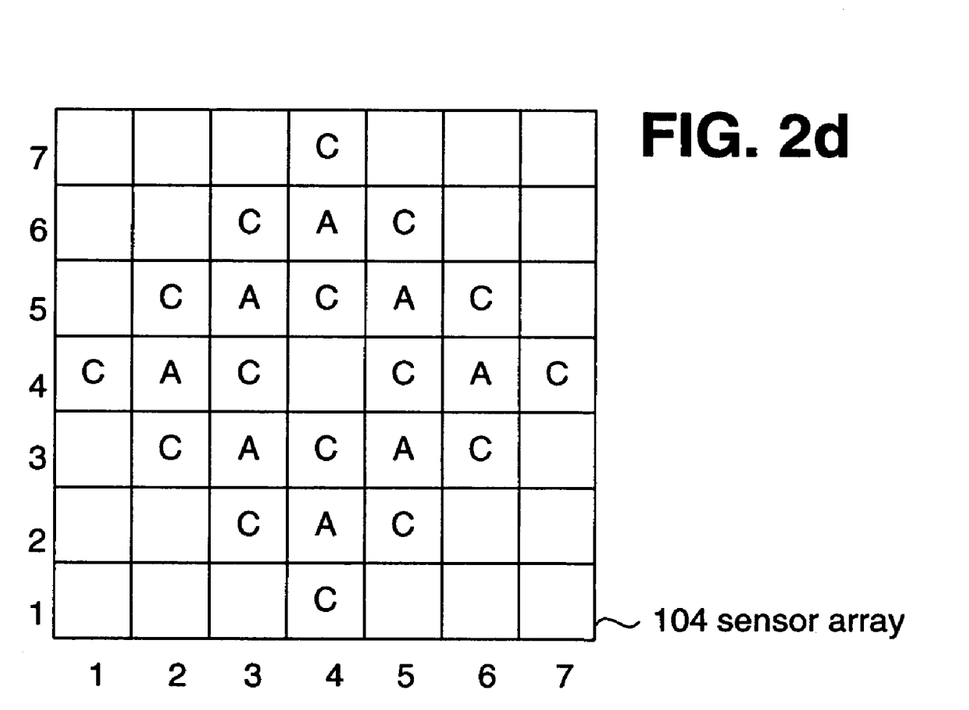

In an embodiment, the processing circuit 106 further selects positions of sensor units outputting valid values; wherein a difference between each valid value and the specific value mentioned above is not larger than a predetermined value. The processing circuit 106 further computes a common geometrical center of the selected positions of sensor units outputting the specific value and the selected positions of sensor units outputting valid values as the optical center. In addition, the processing circuit 106 determines the predetermined value based on a maximum or a minimum among the plurality of values outputted from the sensor array 104. For example, when the lens 102 is convergent, the processing circuit 106 uses the maximum, and when the lens 102 is convergent, the processing circuit 106 uses the minimum.

Referring to FIG. 2d, the value outputted from sensor units A is regarded as the specific value, and the differences between all values outputted from sensor units C and the specific value are equal to or smaller than a predetermined value. The optical center is a geometrical center (4,4) of all the positions of the sensor units A and C. For example, the specific value is equal to "100", and the processing circuit 106 determines the predetermined value as the tenth of the specific value, i.e., "10", so the range of the values outputted from the sensor units C is from "90" to "110". Then the optical center is a geometrical center of all positions of the sensor units outputting values from "90" to "110". Alternatively, when the value of the sensor units A is the maximum (e.g., "100") among the values outputted from the sensor array 104, the processing circuit 106 sorts remaining values from top to bottom, selects the third large value among the remaining values (e.g., "95"), and determines the predetermined value as the difference between the value of sensor units A and the third large value, i.e., "5". In another embodiment, when the value of the sensor units A is the minimum among the values outputted from the sensor array 104, the processing circuit 106 determines the predetermined value as 10 times the value of the sensor units A.

The processing circuit 106 further generates a digital image displaying the positions on the sensor array 104, the outputted values, and the computed optical center on the digital image. The digital image also displays the center of the sensor array 104 to indicate the offset between the center of the sensor array 104 and the computed optical center.

Figure 1B:
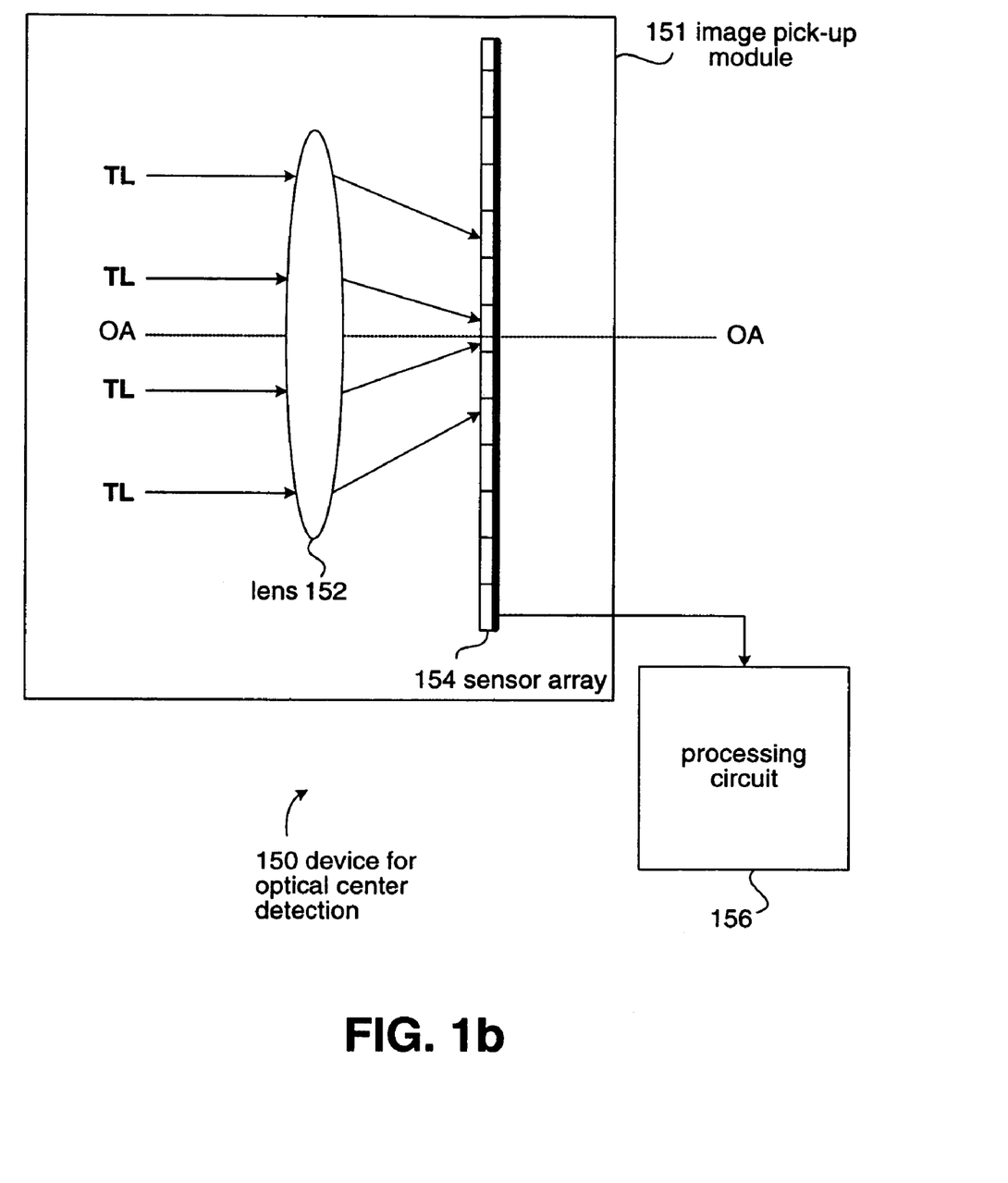
FIG. 1b is an illustration of a device according to another embodiment of the present invention.

FIG. 1b shows a device 150 according to another embodiment of the present invention. The device 150 includes an image pick-up module 151 and a processing circuit 156. The image pick-up module 151 is provided for generating a digital image corresponding to a target. The image pick-up module 151 includes a lens 152 and the sensor array 154. The lens 152 defines an optical axis, OA. A test light, TL, is parallel to OA and is incident to the lens 152. The sensor array 154 receives the test light transmitted by the lens 152. The sensor array 154 has a plurality of sensor units. Each sensor unit has a position on the sensor array 154. By detecting the illumination of the test light transmitted by the lens 152, each sensor unit outputs a value. The processing circuit 156 is linked to the sensor array 154 of the image pick-up module 156. The processing circuit 156 receives values outputted from the sensor units of the sensor array 154, selects positions of sensor units outputting a specific value among the values, and computes an optical center on the sensor array 154. The description of FIGS. 2a-2d for the device 100 can apply to the device 150, and the description for lens 102 and the sensor array 104 also applies to the lens 152 and the sensor array 154.

The embodiments mentioned above rely on the presumption that the image plane has the highest illumination at the position of the optical axis, and the illumination at the other positions of the image plane decrease symmetrically and proportionally from the distance to the optical axis due to light incident obliquely to the image plane. By analyzing the illumination contour line on the image plane, a geometrical center of the contour line can be obtained to locate the optical center on the image plane, whereby the optical center of the sensor array can be determined. As shown in FIG. 2a, the optical center is (3, 4), while the geometrical center of the sensor array is (4, 4). By detecting the offset, the lens and the sensor array can achieve better alignment.

The device 150 can be a digital image forming device, such as a digital camera, a digital camcorder, or other portable electronic devices capable of performing digital camera/camcorder. For further example, the mobile phone with the digital camera functionality or the PDA with the digital camera functionality is also covered by the scope of the present invention.

Figure 3A:
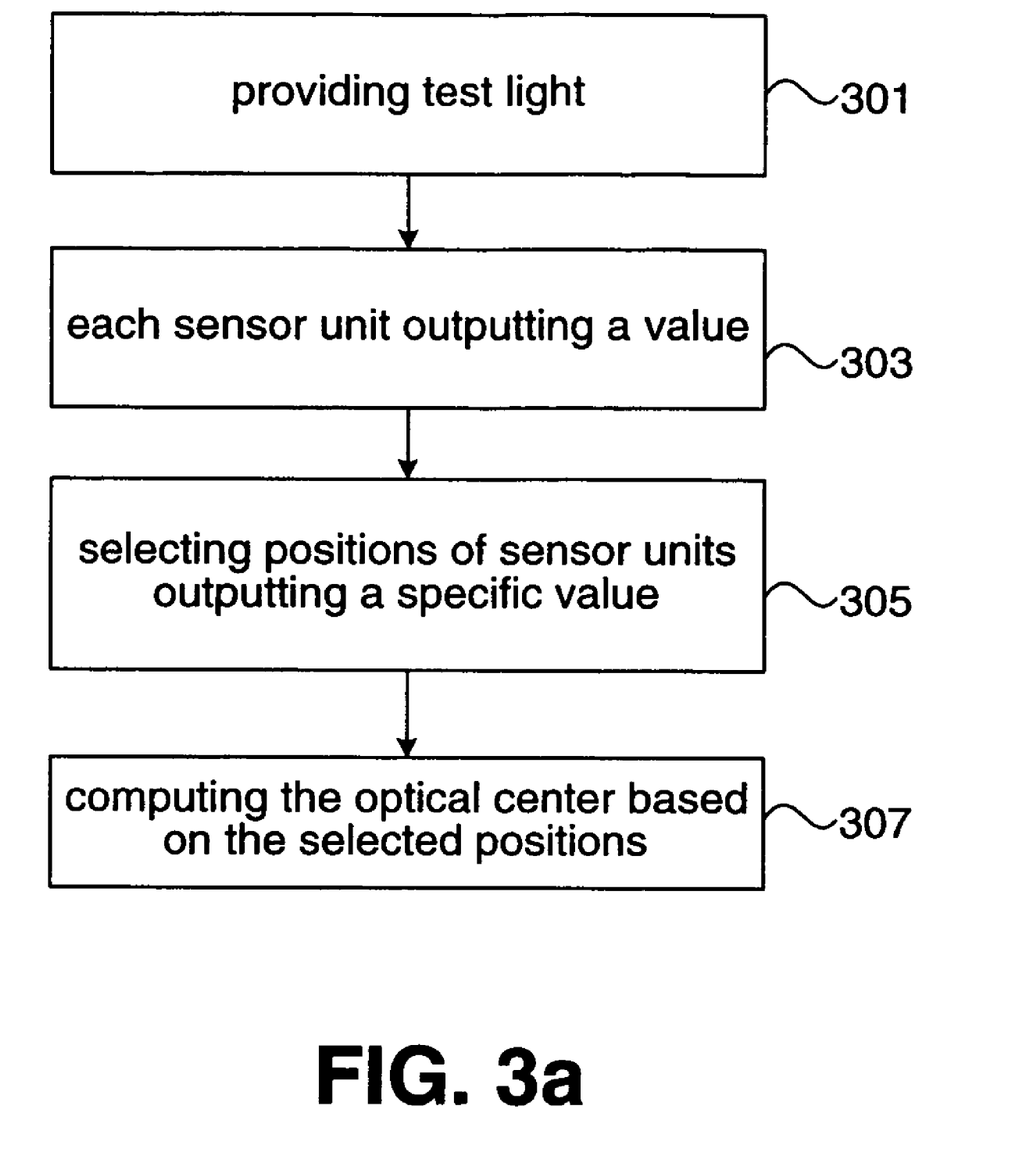
FIG. 3a is a flowchart of a method according to an embodiment of the present invention.
Figure 3B:
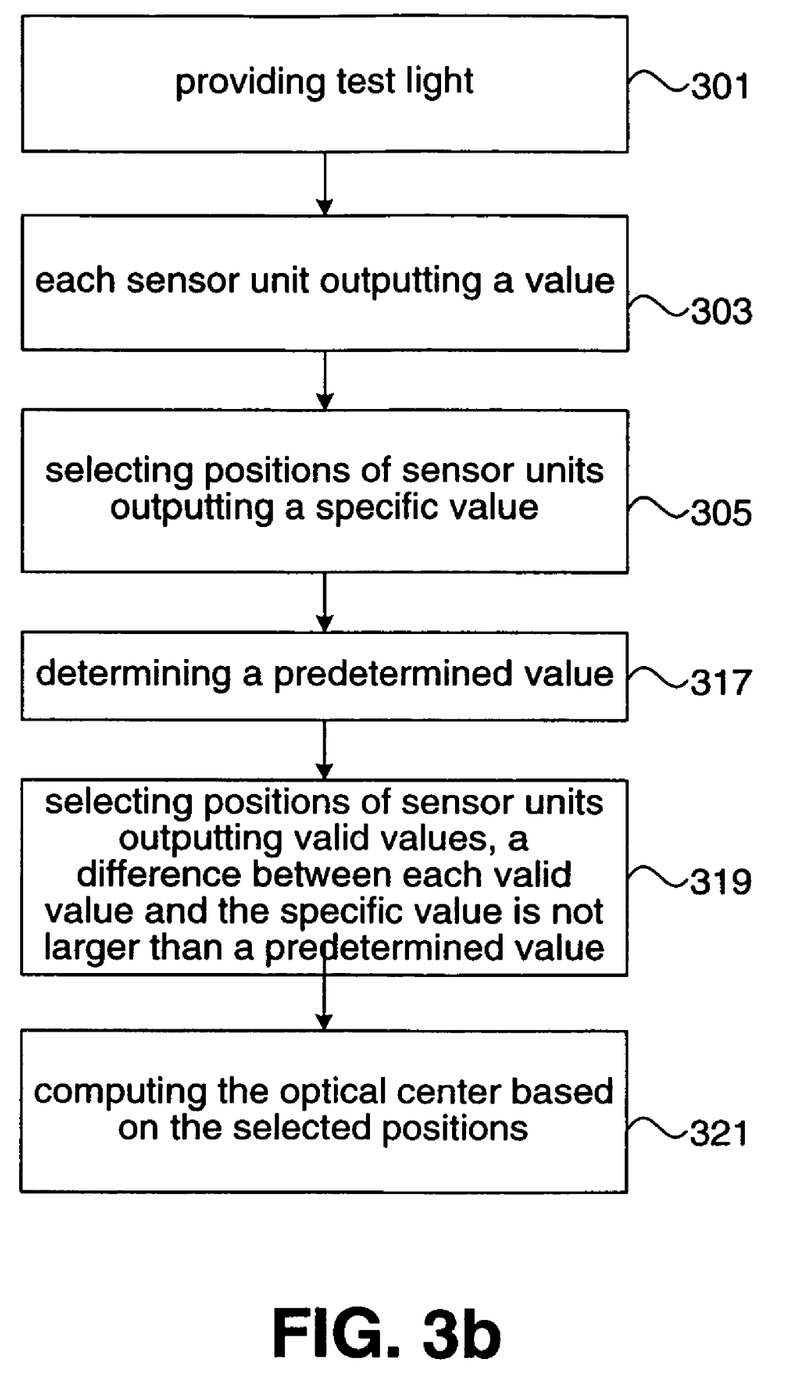
FIG. 3b is a flowchart of a method according to another embodiment of the present invention.

With reference to the device 100 in FIG. 1a, FIG. 3a and FIG. 3b are the flowcharts illustrating the method according to the embodiments of the present invention. It starts from the step 301: providing test light parallel to the optical axis and incident to the lens 102. The test light can be generated by the "light source box LSB-80" of Tsubosaka Electric Co., Ltd.

In the step 303, the sensor array 104 receives the test light transmitted by the lens 102 so that each sensor unit of the sensor array 104 outputs a value. In an embodiment, a digital image is further generated according to the values outputted from the sensor array 104. Then the step 305 is to select positions of sensor units outputting a specific value (e.g., the maximum or the minimum) among the values outputted from the sensor array 104. The step 307 is to compute the optical center on the sensor array 104 based on the selected positions. For example, in the step 307, the geometrical center of all the positions of the sensor units outputting the specific value is determined as the optical center.

Alternatively, in FIG. 3b, the step 317 is to determine a predetermined value based on a maximum or a minimum among the plurality of values outputted from the sensor array 104. For example, when the lens 102 is convergent, the tenth of the maximum is selected as the predetermined value; when the lens 102 is divergent, two times the minimum is selected as the predetermined value. Next, the step 319 is to select positions of sensor units outputting valid values, wherein a difference between each valid value and the specific value is not larger than a predetermined value. Then in the step 321, computing the geometrical center of the selected positions of sensor units outputting the specific value and the selected positions of sensor units outputting valid values as the optical center.

The methods illustrated in FIG. 3a or FIG. 3b can, optionally, include a step of setting a default offset between the optical center and the geometrical center of the sensor array. By comparing the default offset with a calculated offset between the optical center and the geometrical center of the sensor array, the quality of alignment of the lens and the sensor array can be evaluated. For example where the default offset is "X" and the actual offset is "Y", the alignment is qualified if X>Y, otherwise the alignment is unqualified if X<Y. When X<Y, the processing circuit generates a warning signal for the purpose of the quality control.

The methods illustrated in FIG. 3a or FIG. 3b can, optionally, include a step of generating a digital image displaying the positions, the values, and the optical center. Referring to FIGS. 4a-4f, the digital image with "352×288" pixels corresponds to the positions of the sensor units of the sensor array. The positions of the sensor units outputting the values of "90, 100, 110, 120, 130, 140, 150, and 160" are shown in the digital image. Take FIG. 4a for example, the value of "150" is the maximum among the values outputted from the sensor array. Thus the positions of the sensor units outputting the value of "150" are selected (in the step 305), and the optical center is regarded as a geometrical center of all selected positions. In another embodiment for FIG. 4a, the optical center is displayed in the digital image, and the offset between the optical center and the geometrical center of the sensor array is calculated as "3.1452" pixels.

Figure 4A:
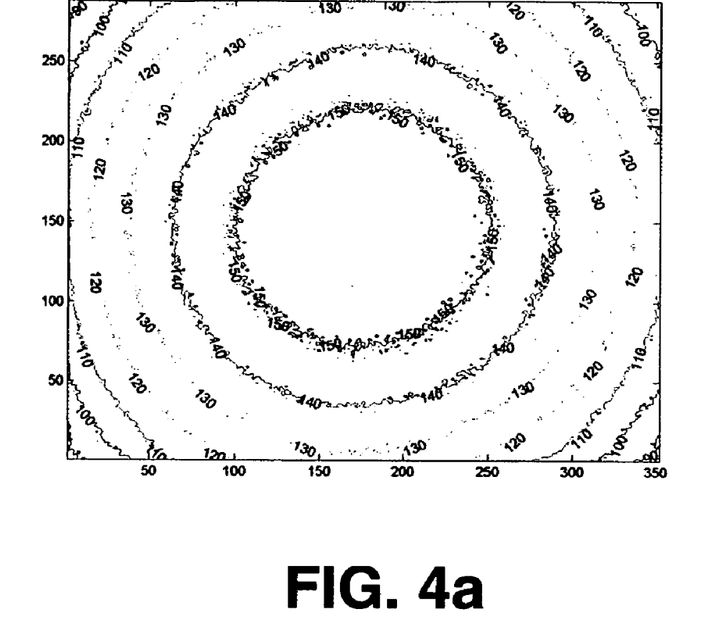
FIGS. 4a-4f are the exemplary digital images according to embodiments of the present invention.
Figure 4B:
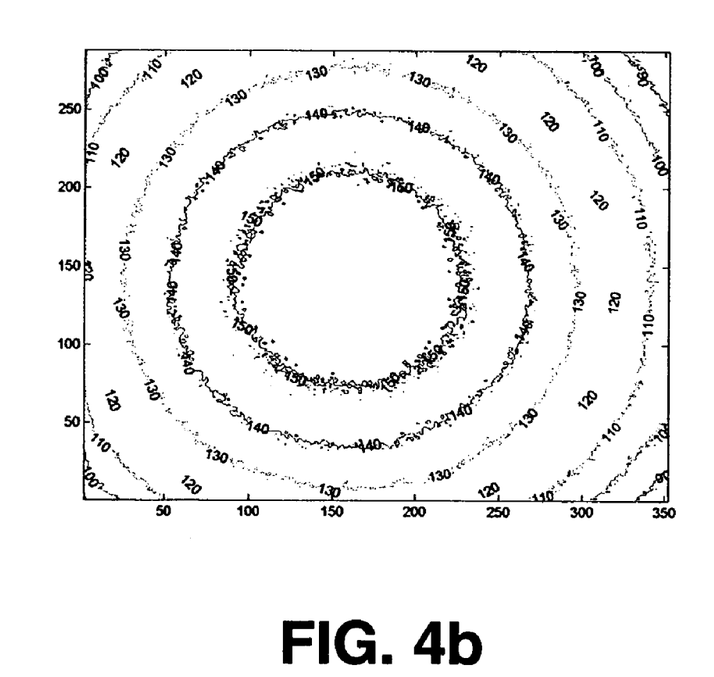

Take FIG. 4b for example, the positions of the sensor units outputting the value of "130" form a close loop, and the sensor units outputting the value of "130" are more than those outputting the value of "140" or "150". Thus the positions of the sensor units outputting the value of "130" are selected (in the step 305), and the optical center is regarded as a geometrical center of all selected positions. In another embodiment for FIG. 4b, the optical center is displayed in the digital image, and the offset between the optical center and the geometrical center of the sensor array is calculated as "15.9203" pixels.

Figure 4C:
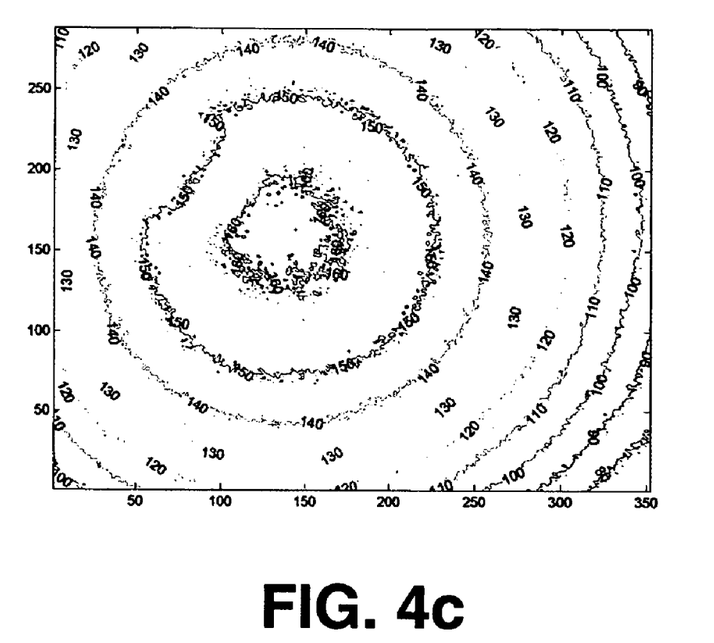

Take FIG. 4c for example, because of the noise, the distribution of the positions of the sensor units outputting the value of "150" is poorly axially symmetrical. Thus the positions of the sensor units outputting the values of "140" and "160" are selected (in the step 305), and the optical center is regarded as a geometrical center of all selected positions. In another embodiment for FIG. 4c, the optical center is displayed in the digital image, and the offset between the geometrical optical center and the center of the sensor array is calculated as "39.224" pixels.

Figure 4D:
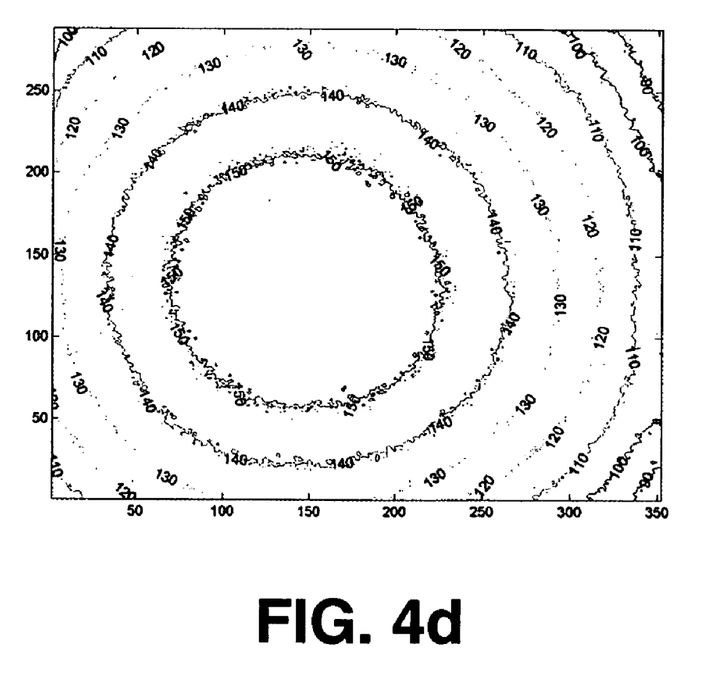

Take FIG. 4d for example, the positions of the sensor units outputting the values of "140" and "150" are selected (in the step 305), and the optical center is regarded as a geometrical center of all selected positions. In another embodiment for FIG. 4d, the optical center is displayed in the digital image, and the offset between the geometrical optical center and the center of the sensor array is calculated as "28.9492" pixels.

Figure 4E:
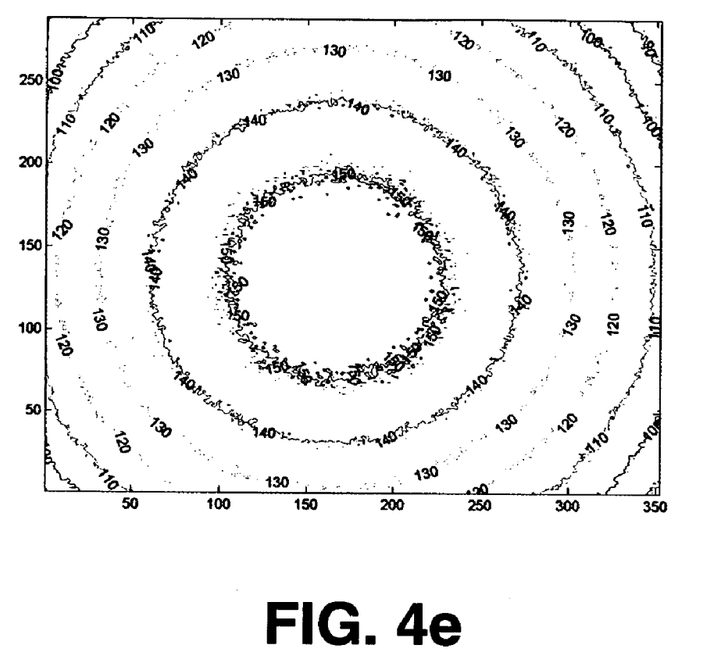

Take FIG. 4e for example, the positions of the sensor units outputting the values of "130", "140", and "150" are selected (in the step 305), and the optical center is regarded as a geometrical center of all selected positions. In another embodiment for FIG. 4e, the optical center is displayed in the digital image, and the offset between the geometrical optical center and the center of the sensor array is calculated as "13.4406" pixels.

Figure 4F:
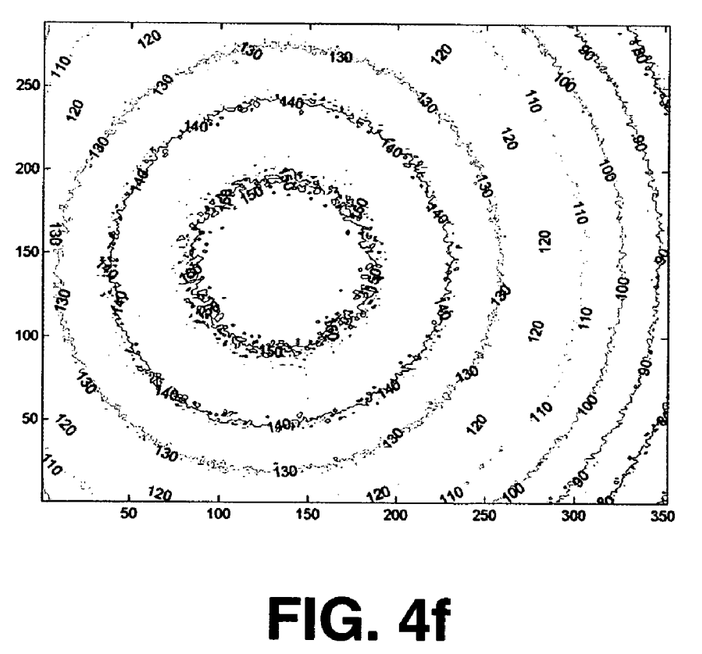

Take FIG. 4f for example, the value of "150" is the maximum among the values outputted from the sensor array, and the predetermined value is determined as "20" (in the step 317). The positions of the sensor units outputting the values from "130" to "150" are selected (in the step 305), and the optical center is regarded as a geometrical center of all selected positions. In another embodiment for FIG. 4f, the optical center is displayed in the digital image, and the offset between the optical center and the geometrical center of the sensor array is calculated as "42.842" pixels.

The present invention also discloses a computer program including program code instructions for controlling the operation of a data processing apparatus on which the program code executes, to perform the methods illustrated in FIG. 3a or 3b. Any suitable computer-readable storage medium may be utilized to store the computer program, including hard disks, CD-ROM, optical storage devices, magnetic storage devices, and/or the like.

While this invention has been described with reference to the illustrative embodiments, these descriptions should not be construed in a limiting sense. Various modifications of the illustrative embodiments, as well as other embodiments of the invention, will be apparent upon reference to these descriptions. It is therefore contemplated that the appended claims will cover any such modifications or embodiments as falling within the true scope of the invention and its legal equivalents.

The invention claimed is:

1. A device for computing an optical center of a sensor array relative to a lens, said sensor array comprising a plurality of sensor units, each sensor unit having a position on said sensor array, said lens defining an optical axis, said device comprising:
    a configuration module, for positioning said lens and said sensor array thereon, wherein when test light is parallel to said optical axis and is incident to said lens, said sensor array receives said test light transmitted by said lens so that each sensor unit outputs a value; and
    a processing circuit, linked to said sensor array for receiving values outputted from said sensor units and selecting positions of sensor units outputting a specific value among said values, for computing said optical center of said sensor array.

2. A device according to claim 1, wherein said configuration module further comprises a digital signal processor (DSP) for incorporating with each sensor unit to output said value.

3. A device according to claim 1, wherein said value represents illumination.

4. A device according to claim 1, wherein said processing circuit further presets a default offset between said optical center and a geometrical center of said sensor array.

5. A device according to claim 4, wherein said processing circuit further generates a warning signal when an offset between said optical center and a geometrical center of said sensor array is larger than said default offset.

6. A device according to claim 1, wherein said processing circuit further generates a digital image for displaying said positions, said values, and said optical center on said digital image.

7. A device according to claim 1, wherein said processing circuit computes said optical center according to a geometrical center of said positions of sensor units outputting said specific value.

8. A device according to claim 1, wherein said specific value is selected from a maximum or a minimum among said plurality of values.

9. A device according to claim 1, wherein said processing circuit further selects positions of sensor units outputting valid values, wherein a difference between each valid value and said specific value is not larger than a predetermined value;
wherein said processing circuit computes said optical center according to a geometrical center of said selected positions of sensor units outputting said specific value and said selected positions of sensor units outputting valid values.

10. A device according to claim 9, wherein said processing circuit determines said predetermined value based on a maximum or minimum among said plurality of values.

11. A device according to claim 9, wherein said specific value is a maximum or a minimum among said plurality of values.

12. A method for computing an optical center of a sensor array relative to a lens, said sensor array comprising a plurality of sensor units, each sensor unit having a position on said sensor array, said lens defining an optical axis, said method comprising:
(a) providing test light parallel to said optical axis and incident to said lens;
(b) receiving, by said sensor array, said test light transmitted by said lens so that each sensor unit outputs a value;
(c) selecting positions of sensor units outputting a specific value among said values outputted from said sensor units; and
(d) computing said optical center of said sensor array based on said selected positions to obtain position data of said optical center.

13. A method according to claim 12, further comprising:
(e) generating a digital image to display said positions; and
(f) indicating said optical center on said digital image.

14. A method according to claim 12, further comprising:
(g) setting a default offset between said optical center and said geometrical center of said sensor array; and
(h) comparing said default offset with an offset between said optical center and said geometrical center of said sensor array.

15. A method according to claim 14, wherein said offset corresponds to a distance offset between said optical center and said geometrical center of said sensor array.

16. A method according to claim 12, in the step (b), said value represents illumination.

17. A method according to claim 16, in the step (c), said specific value is a maximum or a minimum among said plurality of values.

18. A method according to claim 17, wherein the step (c) further comprises:
contouring positions of sensor units outputting said specific value.

19. A method according to claim 12, wherein the step (d) comprises:
computing said optical center according to a geometrical center of said selected positions of sensor units outputting said specific value.

20. A method according to claim 12, wherein said specific value is selected from a maximum or a minimum among said plurality of values.

21. A method according to claim 12, wherein the step (d) further comprises:
(i) selecting positions of sensor units outputting valid values, wherein a difference between each valid value and said specific value is not larger than a predetermined value;
(j) computing said optical center according to a geometrical center of said selected positions of sensor units outputting said specific value and said selected positions of sensor units outputting valid values.

22. A method according to claim 21, wherein the step (i) further comprises:
determining said predetermined value based on a maximum or a minimum among said plurality of values.

23. A method according to claim 21, wherein said specific value is a maximum or a minimum among said plurality of values.

24. A computer program comprising program code instructions for controlling the operation of a data processing apparatus on which the program code executes, to perform a method according to claim 12.

* * * * *